(12) United States Patent
Nguyen et al.

(10) Patent No.: US 12,323,288 B2
(45) Date of Patent: Jun. 3, 2025

(54) METHOD AND DEVICE FOR DETERMINING A CONTROL SIGNAL

(71) Applicant: Robert Bosch GmbH, Stuttgart (DE)

(72) Inventors: Duc Tam Nguyen, Karlsruhe (DE); Michael Klar, Bad Friedrichshall (DE); Zhongyu Lou, Renningen (DE)

(73) Assignee: ROBERT BOSCH GMBH, Stuttgart (DE)

(*) Notice: Subject to any disclaimer, the term of this patent is extended or adjusted under 35 U.S.C. 154(b) by 1171 days.

(21) Appl. No.: 17/262,181

(22) PCT Filed: Aug. 14, 2019

(86) PCT No.: PCT/EP2019/071802
§ 371 (c)(1),
(2) Date: Jan. 21, 2021

(87) PCT Pub. No.: WO2020/064211
PCT Pub. Date: Apr. 2, 2020

(65) Prior Publication Data
US 2021/0294278 A1 Sep. 23, 2021

(30) Foreign Application Priority Data
Sep. 27, 2018 (DE) .......................... 102018216609.9
Nov. 5, 2018 (DE) .......................... 102018218834.3

(51) Int. Cl.
*H04L 41/0631* (2022.01)
*G05B 13/02* (2006.01)
*G06N 3/08* (2023.01)

(52) U.S. Cl.
CPC ........ *H04L 41/0631* (2013.01); *G05B 13/027* (2013.01); *G06N 3/08* (2013.01)

(58) Field of Classification Search
CPC ................................ G05B 13/027; G06N 3/08
See application file for complete search history.

(56) References Cited

U.S. PATENT DOCUMENTS

2008/0263342 A1 10/2008 Knowles et al.
2015/0113649 A1 4/2015 Angelov
(Continued)

FOREIGN PATENT DOCUMENTS

DE 102017210787 A1 12/2018
WO 0002135 A2 1/2000

OTHER PUBLICATIONS

Minskuli, Gan, CTGNet GIA, CSDN, (2017), pp. 1-9; http://blog.csdn.net/qq_31531635/article/details/70670271 (partially translated into English—see p. 3).
(Continued)

*Primary Examiner* — Mark A Connolly
(74) *Attorney, Agent, or Firm* — NORTON ROSE FULBRIGHT US LLP

(57) ABSTRACT

A computer-implemented method for classifying an input signal that is ascertained as a function of an output signal of a sensor as to whether or not it has an anomaly, it being decided, as a function of an output signal of an autoencoder (60) to which the input signal is supplied, whether or not the input signal has the anomaly. The autoencoder has at least one encoder and at least one decoder. An intermediate variable is ascertained as a function of the input signal by the encoder, and the output signal is ascertained by the decoder as a function of the intermediate variable. The autoencoder provides, for the input signal supplied to it, a plurality of hypotheses of formula for the reconstruction of the input signal, and the output signal is ascertained as a function of this plurality of hypotheses of formula.

17 Claims, 17 Drawing Sheets

(56) References Cited

U.S. PATENT DOCUMENTS

| | | | |
|---|---|---|---|
| 2018/0082150 A1* | 3/2018 | Itou | G06F 11/0754 |
| 2018/0234348 A1 | 8/2018 | Goloubew et al. | |
| 2019/0036952 A1* | 1/2019 | Sim | G06V 10/764 |
| 2019/0286506 A1* | 9/2019 | Cheng | G06F 11/0793 |

OTHER PUBLICATIONS

International Search Report for PCT/EP2019/071802, Issued Dec. 4, 2019.

Diederik P KINGMA, et al., "Auto-Encoding Variational Bayes," Cornell University Library, 2014, pp. 1-14. <https://arxiv.org/pdf/1312.6114.pdf> Downloaded Jan. 20, 2021.

Christian Rupprecht, et al., "Learning in an Uncertain World: Representing Ambiguity Through Multiple Hypotheses," Cornell University Library, 2017, pp. 1-10. <https://arxiv.org/pdf/1612.00197.pdf> Downloaded Jan. 20, 2021.

Eddy Ilg, et al., "Uncertainty Estimates and Multi-Hypotheses Networks for Optical Flow," Cornell University Library, 2018, pp. 1-30. <https://arxiv.org/pdf/1802.07095.pdf> Downloaded Jan. 20, 2021.

Anders Boesen Lindbo Larsen, et al., "Autoencoding Beyond Pixels Using a Learned Similarity Metric," Cornell University Library, 2016, pp. 1-8. <https://arxiv.org/pdf/1512.09300.pdf> Downloaded Jan. 20, 2021.

Alexey Dosovitskiy, et al., "Generating Images With Perceptual Similarity Metrics Based on Deep Networks," Cornell University Library, 2016, pp. 1-14. <https://arxiv.org/pdf/1602.02644.pdf> Downloaded Jan. 20, 2021.

Ahmed A., et al., "Cyber Physical Security Analytics for Anomalies in Transmission Protection Systems," 2018 IEEE Industry Applications Society Annual Meeting, IEEE, 2018, pp. 1-8.

Park Seong Hyeon et al., "Sequence-to-Sequence Prediction of Vehicle Trajectory via LSTM Encoder-Decoder Architecture," Cornell University Library, 2018, pp. 1-7. <https://arxiv.org/pdf/1802.06338.pdf> Downloaded Jan. 20, 2021.

Osvaldo Simeone, "A Very Brief Introduction to Machine Learning With Applications to Communication Systems," Cornell University Library, 2018, pp. 1-20. <https://arxiv.org/pdf/1808.02342.pdf> Downloaded Jan. 20, 2021.

\* cited by examiner

METHOD AND DEVICE FOR DETERMINING A CONTROL SIGNAL

FIELD

The present invention relates to a method and a device for classifying an input signal and ascertaining a control signal, in particular for controlling an actuator, and to a method for training the machine learning system, a training system, a computer program, and a machine-readable storage medium.

BACKGROUND INFORMATION

German Patent Application No. DE 10 201 721 0787.1 describes a method for ascertaining whether an anomaly is present in a communication network, at least one message communicated via the communication network being analyzed by ascertaining an input variable of an encoder as a function of the communicated message, in particular from the communicated message, an intermediate variable having reduced dimensionality being ascertained by the encoder, and, as a function of the intermediate variable, an output variable being ascertained by a decoder, the output variable having the dimensionality of the input variable, it being decided as a function of the input variable and output variable whether or not the anomaly is present. Such a combination of encoder and decoder, such that the input variable is translated into the output variable via one or more intermediate variables having reduced dimensionality, i.e., associated with a loss of information, can also be designated by the term "autoencoder."

"Auto-Encoding Variational Bayes," arXiv preprint arXiv:1312.6114v10, Diederik P Kingma, Max Welling, 2014, describes a variational autoencoder.

"Learning in an Uncertain World: Representing Ambiguity Through Multiple Hypotheses," arXiv preprint arXiv: 1612. 00197v3, Christian Rupprecht et al., International Conference on Computer Vision (2017), and "Uncertainty Estimates and Multi-Hypotheses Networks for Optical Flow," arXiv preprint arXiv: 1802. 07095v3, Eddy Ilg et al. (2018), describe convolutional neural networks (CNN) that predict a multiplicity of hypotheses.

"Autoencoding beyond pixels using a learned similarity metric," arXiv preprint arXiv: 1512. 09300v2, Anders Boesen Lindbo Larsen, Søren Kaae Sønderby, Hugo Larochelle, Ole Winther, 2016, and "Generating Images with Perceptual Similarity Metrics based on Deep Networks," arXiv preprint arXiv: 1602. 02644v2, Alexey Dosovitskiy, Thomas Brox, 2016, describe methods for training variational autoencoders with a two-player game.

AHMED A ET AL: "Cyber Physical Security Analytics for Anomalies in Transmission Protection Systems", 2018 IEEE INDUSTRY APPLICATIONS SOCIETY ANNUAL MEETING (IAS), IEEE, 23. September 2018 (2018-09-23), pages 1-8, XP033453855, DOI: 10.1109/IAS.2018.8544672 describes an approach based on a data analysis, which combines a signature-based method for detecting an intrusion into a cyber system and a learning algorithm for detecting a malfunction in the physical system.

PARK SEONG HYEON ET AL: "Sequence-to-Sequence Prediction of Vehicle Trajectory via LSTM Encoder-Decoder Architecture", 2018 IEEE INTELLIGENT VEHICLES SYMPOSIUM (IV), IEEE, 26. June 2018 (2018-06-26), pages 1672-1678, XP033423538, DOI: 10.1109/IVS.2018.8500658 describes a learning-based vehicle prediction technology, which makes it possible to generate the future trajectory sequence of the vehicles in real time.

SUMMARY

Example embodiments of the present invention may have an advantage that the anomaly recognition has improved capacity for extrapolation, so that the resulting control method is more robust, or alternatively achieves a comparable robustness using fewer training data.

In a first aspect, the present invention therefore relates to a method. Further aspects and advantageous developments of the present invention are described herein.

In its first aspect, the present invention relates to a method for classifying an input signal that is in particular ascertained as a function of a sensor signal, i.e., an output signal of a sensor. In accordance with an example embodiment of the present invention, as a function of an output signal of an autoencoder to which the input signal is provided, it is decided whether or not the input signal has an anomaly, the autoencoder having at least one encoder and at least one decoder, an intermediate variable being ascertained by the encoder as a function of the input signal, and the output signal being ascertained as a function of this intermediate variable by the decoder, the autoencoder providing, for the input signal supplied to it, a multiplicity of different hypotheses for reconstructing the input signal, and ascertaining the output signal as a function of this plurality of different hypotheses.

These hypotheses are preferably different pairwise, i.e., no two of the hypotheses are identical. This can be preferably ensured in that, in a training phase of the autoencoder in which parameters of the autoencoder are varied in order to minimize a specifiable cost function, the cost function is selected such that it assesses a penalty when two hypotheses are too similar to one another, in particular are identical.

In a development of the present invention, it can be provided that the autoencoder includes a multiplicity of decoders, each of the decoders providing output variables as a function of the output variables of a respective decoder.

In this way, using for example the approach presented above it can be prevented that two hypotheses are identical, for example by selecting the decoders to be structurally different and/or by initializing their parameters differently. Of course, it is possible for the decoders to be partly identical. For example, if the decoders are implemented by artificial neural networks, it can be provided that the first layers of all decoders are divided and that the decoders do not differ until the final layer or the final layers.

Preferably, it can be provided that the output signal is selected as a function of, in particular equal to, that one of the hypotheses that is closest to the input signal.

In a development of the present invention, a control signal can be provided that is a function of whether or not an anomaly has been recognized. This control signal can be provided in particular for the controlling of an actuator, preferably for controlling an at least partly automated vehicle.

In a further aspect of the present invention, a system is provided that is set up to carry out one of the methods mentioned above. This system thus also includes the autoencoder mentioned above.

In a further aspect of the present invention, a method is provided for training this autoencoder. This is done using a discriminator. The discriminator is provided with either an input signal ascertained in particular from sensor signals, or an output signal generated by the autoencoder, the discriminator being trained to distinguish whether the signal supplied to it is the input signal or the output signal generated by the autoencoder, and the autoencoder being trained to generate the output signal in such a way that the discriminator cannot discriminate the input signal and the generated output signal in such a way. That is, the discriminator and the autoencoder play a two-player game, similar to the game used in so-called generative adversarial networks (GAN).

In order to make this conventional two-player game usable for the present autoencoder, it is therefore provided that the intermediate variable be randomly generated and that the output signal, which is then supplied to the discriminator for the discrimination, be ascertained by the decoder.

In particular, the intermediate variable can be drawn from a fixedly specifiable probability distribution, only the discriminator being trained as a function of the output signal that is ascertained as a function of the distribution.

That is, this output signal enters into a term of the cost function in such a way that, as a function of gradients of this cost function, only parameters that characterize the discriminator are immediately varied. This cost function goes into the variation of further parameters only insofar as the discriminator parameterized with varied parameters has a modified characteristic that, in a later iteration of the training method, can have the result that parameters of the autoencoder are varied in a modified fashion.

It is also possible for the encoder to ascertain, as a function of the input signal, parameters that characterize the one statistical distribution, in particular a normal distribution, of the intermediate variable for a given input signal, the intermediate variable being drawn from this statistical distribution.

In order to ensure that the anomaly recognition falsely identifies as anomalies as few input signals as possible, it can be provided that, from the multiplicity of hypotheses generated by the autoencoder, the one is selected that is most similar to the input signal, the discriminator attempting only as a function of this selected most similar hypothesis, to decide whether or not it was generated by the autoencoder, an adaptation of parameters that characterize the discriminators and/or the autoencoders being a function of the result of this attempted decision.

However, this can have the result that the gradients associated with the other generated hypotheses disappear, so that the remaining hypotheses do not contribute to the desired extent to the improvement of the extrapolation capacity of the proposed autoencoder. In order to counteract this effect, it can be provided that for each hypothesis generated as a function of this intermediate variable by the autoencoder the discriminator attempts to decide whether or not it was generated by the autoencoder, a variation of parameters that characterize the discriminators and/or the autoencoders being a function of the results of all these attempted decisions.

Below, specific embodiments of the present invention are explained in more detail with reference to the figures.

DETAILED DESCRIPTION OF EXAMPLE EMBODIMENTS

Figure 1:
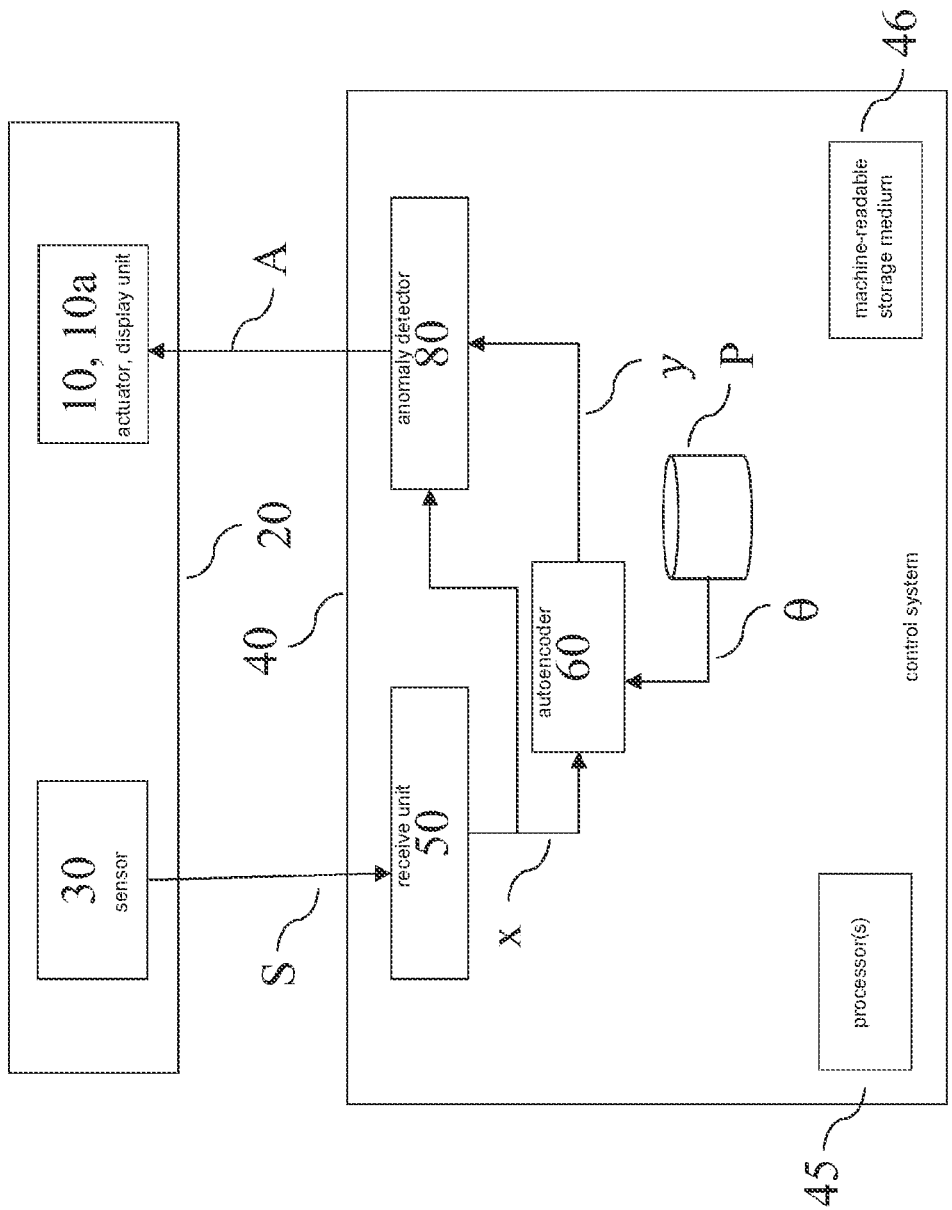
FIG. 1 schematically shows an autoencoder according to an example embodiment of the present invention.

FIG. 1 shows an actuator 10 in its environment 20, in interaction with a control system 40. Actuator 10 and environment 20 are together also referred to as an actuator system. At preferably regular temporal intervals, a state of the actuator system is acquired by a sensor 30 that can also be provided by a plurality of sensors. Sensor signal S— or, in the case of a plurality of sensors, a respective sensor signal S—of sensor 30 is communicated to control system 40. Control system 40 thus receives a sequence of sensor signals S. From these, control system 40 ascertains control signals A, which are transmitted to actuator 10.

Control system 40 receives the sequence of sensor signals S of sensor 30 in an optional receive unit 50 that converts the sequence of sensor signals S into a sequence of input signals x (alternatively, each sensor signal S can also be immediately taken over as input signal x). Input signal x can for example be a segment or a further processing of sensor signal S. Input signal x can for example include image data or images, or individual frames of a video recording. In other words, input signal x is ascertained as a function of sensor signal S. Input signal x is supplied to an autoencoder 60, as illustrated as an example in FIG. 2. Input signal x is also supplied to an anomaly detector 80.

Autoencoder 60 is preferably parameterized by parameters ϕ, θ, which are stored in a parameter memory P and are provided by this memory.

Figure 17:
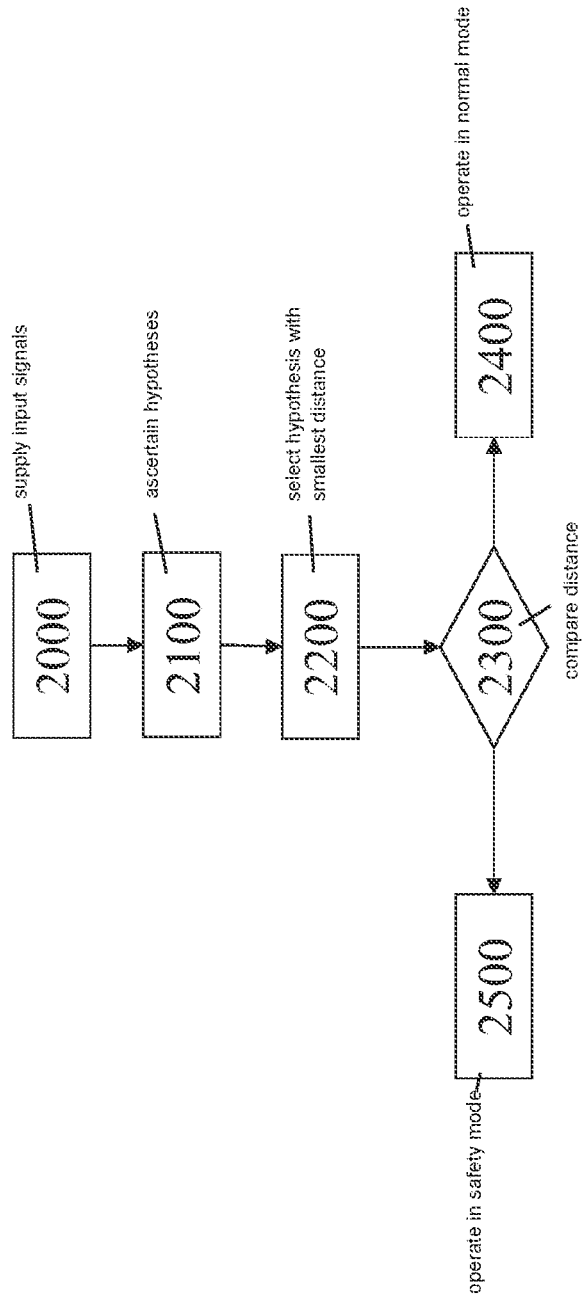
FIG. 17 shows, in a flow diagram, an embodiment of a method for operating the control system, in accordance with the present invention.

From the input signals x, autoencoder 60 ascertains output signals y. Output signals y are supplied to anomaly detector 80. Output signal y is a reconstruction of input signal x by autoencoder 60. From input signal x and output signal y, anomaly detector 80 ascertains a measure of similarity between input signal x and output signal y. As a function of this ascertained measure of similarity, the anomaly detector can ascertain control signals A that are supplied to actuator 10 in order to correspondingly control actuator 10. For example, it can be decided whether actuator 10 is controlled in a normal mode or in a safety mode. A specific embodiment of this method is illustrated in FIG. 17.

Actuator 10 receives control signals A, is correspondingly controlled, and carries out a corresponding action. Here, actuator 10 can include a controller logic (not necessarily integrated in the construction of the device) that ascertains, from control signal A, a second control signal with which the implementation of control signal A is brought about.

In further specific embodiments, control system 40 includes sensor 30. In still further specific embodiments, control system 40 alternatively or in addition also includes actuator 10.

In further preferred specific embodiments, control system 40 includes one, or a plurality of, processor(s) 45, and at least one machine-readable storage medium 46 on which instructions are stored that, when they are executed on processors 45, cause control system 40 to carry out the method according to the present invention.

In alternative specific embodiments, a display unit 10a is provided alternatively or in addition to actuator 10.

Figure 2:
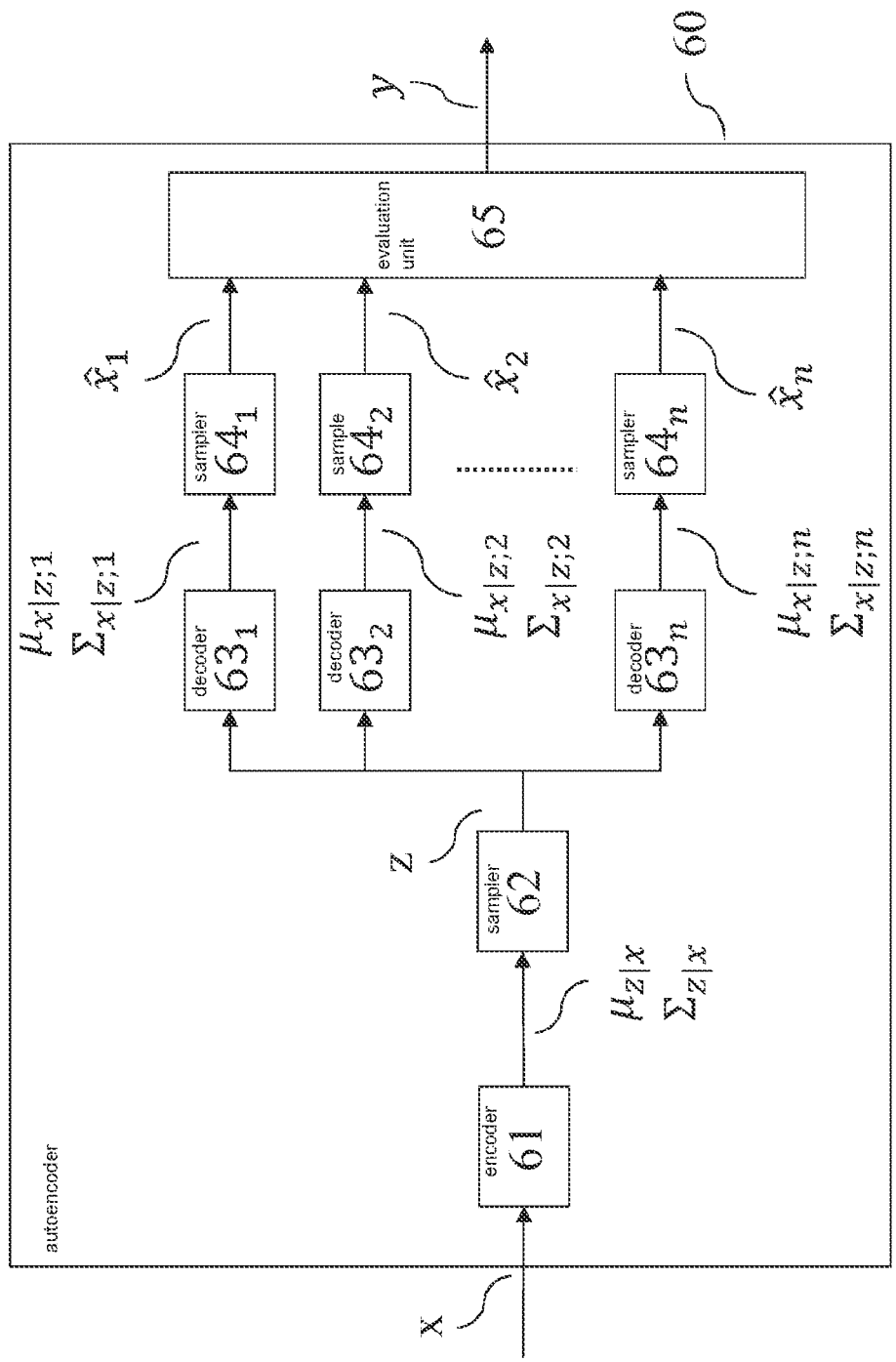
FIG. 2 schematically shows a design of a specific embodiment of the present invention.

FIG. 2 shows an example of a design of autoencoder 60. Autoencoder 60 includes an encoder 61, with the aid of which an intermediate variable z is ascertained from input signal x. A dimensionality of intermediate variable z is reduced compared to input signal x. Autoencoder 60 further includes decoders $63_1$, $63_2$, . . . , with the aid of which reconstructed input signals . . . $\hat{x}_1$, $\hat{x}_2$, are ascertained from intermediate variable z. These reconstructed input signals $\hat{x}_1$, $\hat{x}_2$, . . . are also referred to as "hypotheses," and preferably have the same dimensionality as input signal x. An evaluation unit 65 ascertains output signal y from the hypotheses $\hat{x}_1$, $\hat{x}_2$, . . . . For example, it can be provided that evaluation unit 65 selects as output signal y, from the hypotheses $\hat{x}_1, \hat{x}_2$, . . . , the one that is most similar to the input signal.

In the depicted exemplary embodiment, autoencoder 60 is realized as a so-called variational autoencoder (VAE). The VAE is distinguished in that encoder 61 ascertains, as a function of input signal x, parameters $\mu_{z|x}$, $\Sigma_{z|x}$ that characterize a statistical distribution q(z|x) of the intermediate variable z associated with input signal x for a given input signal x. For example, the statistical distribution q(z|x) can be given by a normal distribution, and the parameters $\mu_{z|x}$, $\Sigma_{z|x}$ (in some circumstances vector values or matrix values, if input signal x is multidimensional) are mean values $\mu_{z|x}$ and covariance matrix $\Sigma_{z|x}$.

From the statistical distribution q(z|x) characterized by these parameters $\mu_{z|x}$, $\Sigma_{z|x}$, a sampler 62 then draws one or more intermediate variables z as statistical samples.

These are supplied to decoders $63_1$, $63_2$, . . . , which respectively ascertain therefrom parameters $\mu_{x|z;1}$, $\Sigma_{x|2;1}$, $\mu_{x|z;2}$, $\Sigma_{x|z;2}$, each of which characterizes statistical distributions $p_1(x|z)$, $p_2(x|z)$ . . . of the hypotheses $\hat{x}_1$, $\hat{x}_2$.

These statistical distributions $p_1(x|z)$, $p_2(x|z)$), . . . are for example each the same function that can be characterized by different parameters $\mu_{x|z;1}$, $\Sigma_{x|z;1}$, $\mu_{x|z;2}$, $\Sigma_{x|z;2}$, . . . . For example, the statistical distributions $p_1(x|z)$, $p_2(x|z)$, . . . can each be given by normal distributions, and the parameters $\mu_{x|z;1}$, $\Sigma_{x|z;1}$, $\mu_{x|z;2}$, $\Sigma_{x|z;2}$, . . . are (in some circumstances vector-valued or matrix-valued, if intermediate variable z is multi-dimensional) mean values $\mu_{x|z;1}$, $\mu_{x|z;2}$, . . . and covariance matrices, $\Sigma_{x|z;1}$, $\Sigma_{x|z;2}$, . . .

From the statistical distributions $p_1(x|z)$, $p_2(x|z)$, . . . characterized by these parameters $\mu_{x|z;1}$, $\Sigma_{x|z;1}$, $\mu_{x|z;2}$, $\Sigma_{x|z;2}$, . . . , samplers $64_1$, $64_2$, . . . then each draw, as statistical samples, hypotheses $\hat{x}_1$, $\hat{x}_2$.

Encoders 61 and/or decoders $63_1$, $63_2$, . . . are preferably neural networks parameterized by parameters ϕ, θ.

Figure 3:
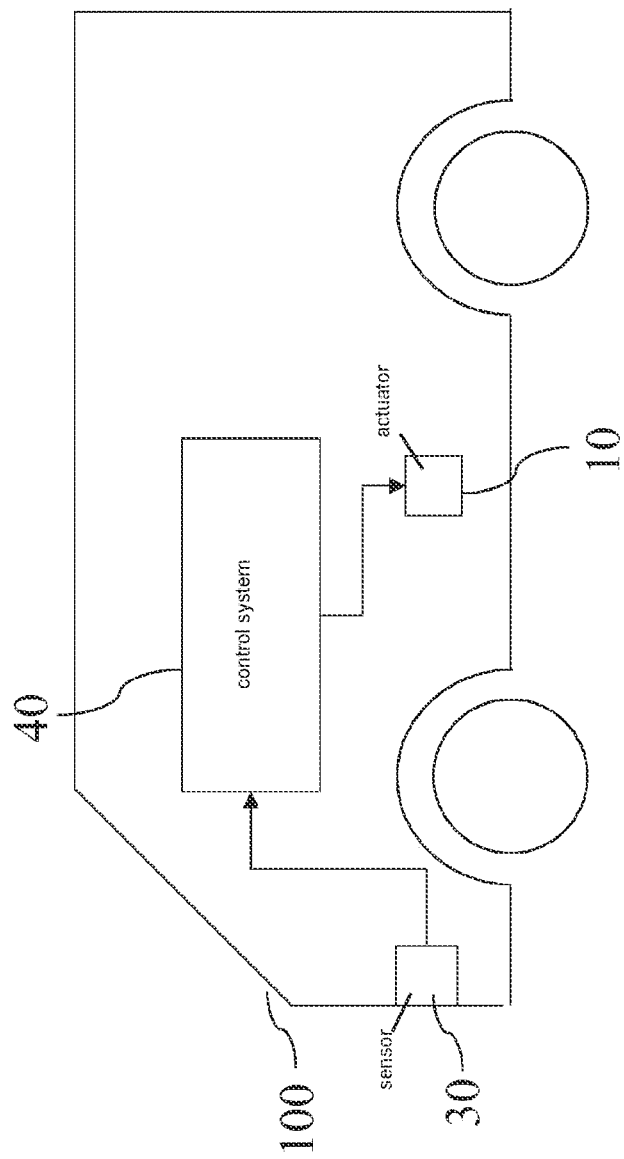
FIG. 3 schematically shows an exemplary embodiment of the present invention for controlling an at least partly autonomous robot.

FIG. 3 shows an exemplary embodiment in which control system 40 is used to control an at least partly autonomous robot, here an at least partly autonomous vehicle 100.

Sensor 30 can be for example one or more video sensors preferably situated in motor vehicle 100, and/or one or more radar sensors and/or one or more ultrasound sensors and/or one or more lidar sensors and/or one or more position sensors (for example GPS). Alternatively or in addition, sensor 30 can also include an information system that ascertains an item of information concerning a state of the actuator system, such as a weather information system that ascertains a current or future state of the weather in the surrounding environment 20.

Input signal x can for example contain information about objects detected in the surrounding environment of the at least partly autonomous robot.

Actuator 10, preferably situated in motor vehicle 100, can be for example a brake, a drive, or a steering mechanism of motor vehicle 100. Control signal A can then be ascertained in such a way that actuator or actuators 10 are controlled, in the normal mode, in such a way that vehicle 100 for example prevents a collision with identified objects, in particular objects of specified classes, e.g., pedestrians. In the safety mode, actuator or actuators 10 can be controlled in such a way that for example a speed of motor vehicle 100 is limited to a specifiable speed range.

Alternatively, the at least partly autonomous robot can also be another mobile robot (not shown), for example one that moves by flying, swimming, submersion, or walking. The mobile robot can for example also be an at least partly autonomous lawnmower or an at least partly autonomous cleaning robot. In these cases as well, control signal A, in the normal mode, can be ascertained such that the drive and/or steering of the mobile robot is controlled in such a way that the at least partly autonomous robot for example prevents a collision with the identified objects.

In a further alternative, the at least partly autonomous robot can also be a yard robot (not shown) that ascertains, using an imaging sensor 30, a type or a state of plants in the surrounding environment 20. Actuator 10 can then for example be an applicator for chemicals. Control signal A can then, in the normal mode, be ascertained, as a function of the ascertained type or the ascertained state of the plants, in such a way that a quantity of chemicals corresponding to the ascertained type or state is applied. In the safety mode, control signal A can be selected such that the applied quantity of the chemicals is limited to a specifiable chemical range.

In still further alternatives, the at least partly autonomous robot can also be a household device (not shown), in particular a washing machine, a range, an oven, a microwave oven, or a dishwasher. Sensor 30, for example an optical sensor, can acquire a state of an object treated using the household device, for example, in the case of the washing machine, a state of laundry in the washing machine. From this, a type or state of this object can then be ascertained. Control signal A can then be ascertained, in the normal mode, in such a way that the household device is controlled as a function of the ascertained type or the ascertained state of the object. For sample, in the case of the washing machine, the machine can be controlled as a function of which material the laundry in it is made of. Control signal A can then be selected as a function of which material of the laundry was ascertained. Control signal A can be selected, in the safety mode, such that the household device, for example the washing machine, is switched off.

Figure 4:
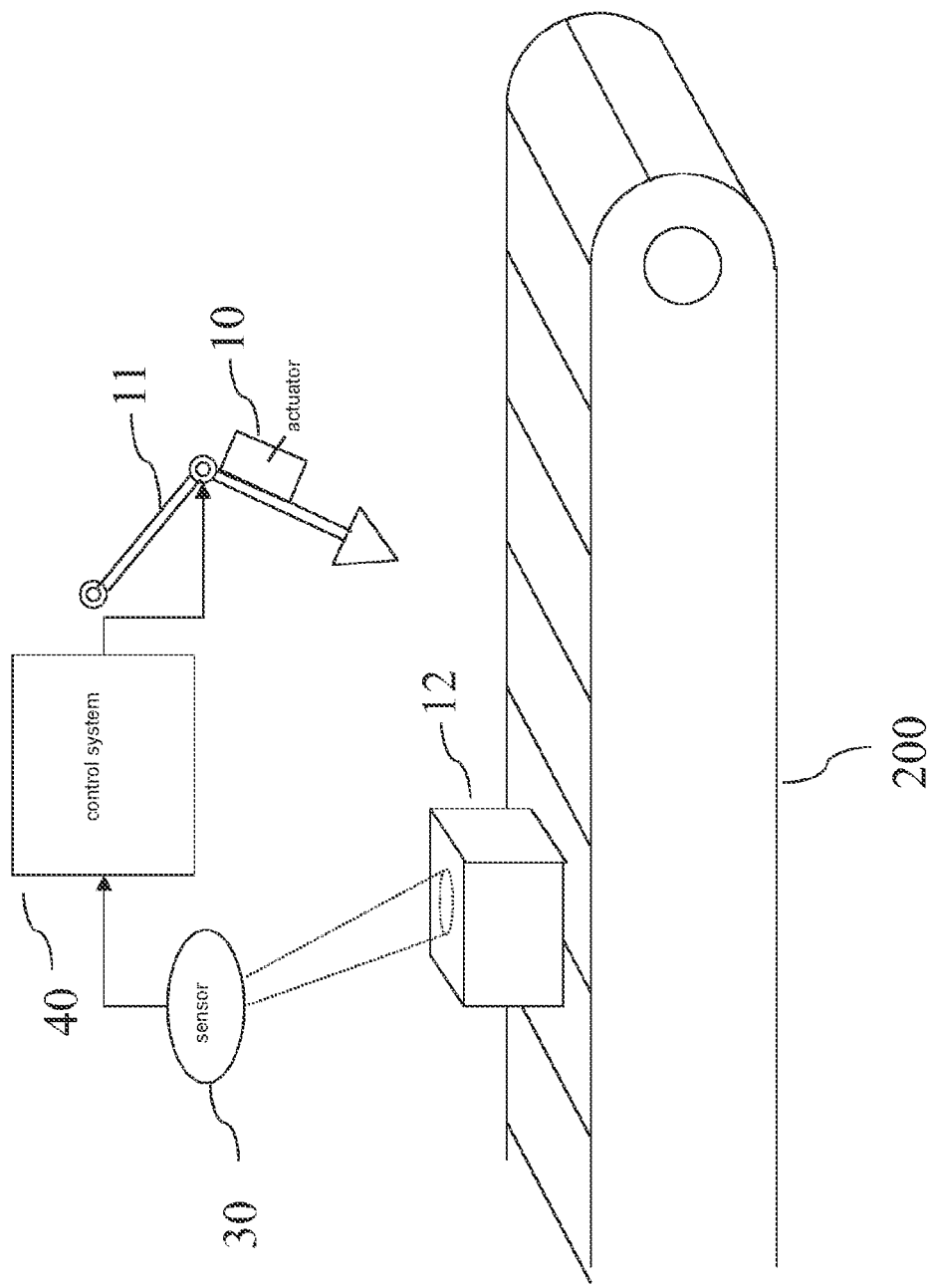
FIG. 4 schematically shows an exemplary embodiment of the present invention for controlling a production system.

FIG. 4 shows an exemplary embodiment in which control system 40 is used to control a production machine 11 of a production system 200, by controlling actuator 10 that controls this production machine 11. Production machine 11 can for example be a machine for stamping, sawing, drilling, and/or cutting.

Sensor 30 can then for example be an optical sensor that acquires for example properties of manufactured products 12. It is possible for actuator 10 controlling production machine 11, in the normal mode, to be controlled as a function of the ascertained properties of manufactured product 12, so that production machine 11 correspondingly carries out a subsequent processing step of this manufactured product 12. It is also possible for sensor 30 to ascertain the properties of manufactured product 12 processed by production machine 11, and, as a function thereof, to adapt a controlling of production machine 11 for a subsequent manufactured product. In the safety mode, it can be provided that actuator 10 is controlled in such a way that the production machine is switched off.

Figure 5:
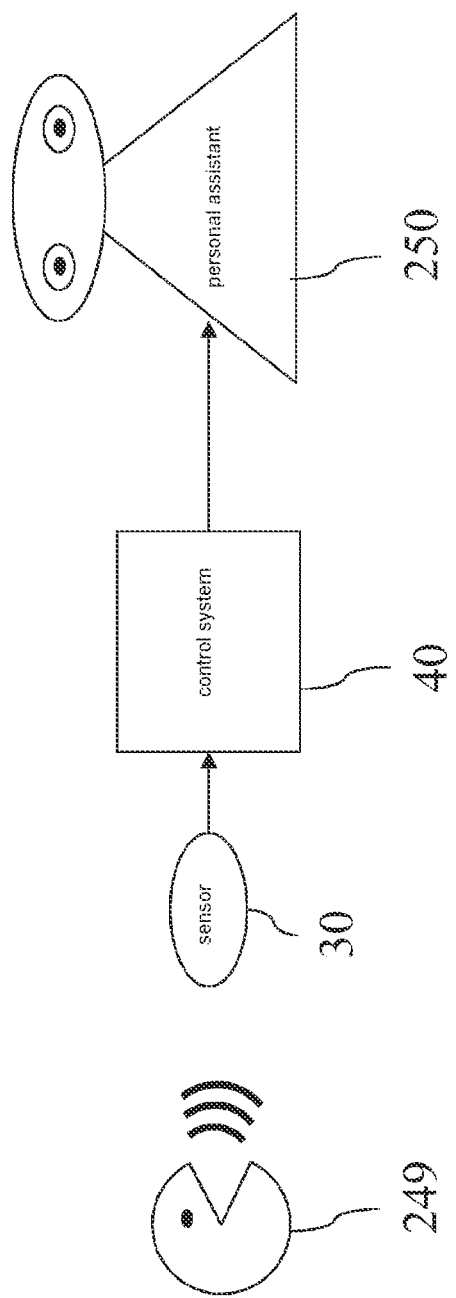
FIG. 5 schematically shows an exemplary embodiment of the present invention for controlling a personal assistant.

FIG. 5 shows an exemplary embodiment in which control system 40 is used to control a personal assistant 250. Sensor 30 is for example an acoustic sensor that receives speech signals from a user 249. Alternatively or in addition, sensor 30 can also be set up to receive optical signals, for example video images of a gesture of user 249.

As a function of the signals of sensor 30, control system 40 ascertains, in the normal mode, a control signal A of personal assistant 250, for example in that the machine learning system carries out a gesture recognition. This ascertained control signal A is then communicated to personal assistant 250, and it is thus correspondingly controlled. This ascertained control signal A is can be selected such that it corresponds to a presumed desired controlling by user 249. This presumed desired controlling can be ascertained as a function of the recognized gesture. Control system 40 can then, as a function of the presumed desired controlling, select control signal A for communication to personal assistant 250, and/or can select control signal A for communication to the personal assistant 250 corresponding to the presumed desired controlling.

This corresponding controlling can for example contain the feature that personal assistant 250 calls information from a database and presents it so as to be usable by user 249.

In the safety mode, it can be provided that personal assistant 250 is switched off, or issues an error message.

Instead of personal assistant 250, a household device (not shown), in particular a washing machine, a range, an oven, a microwave oven, or a dishwasher can be provided in order to be correspondingly controlled.

Figure 6:
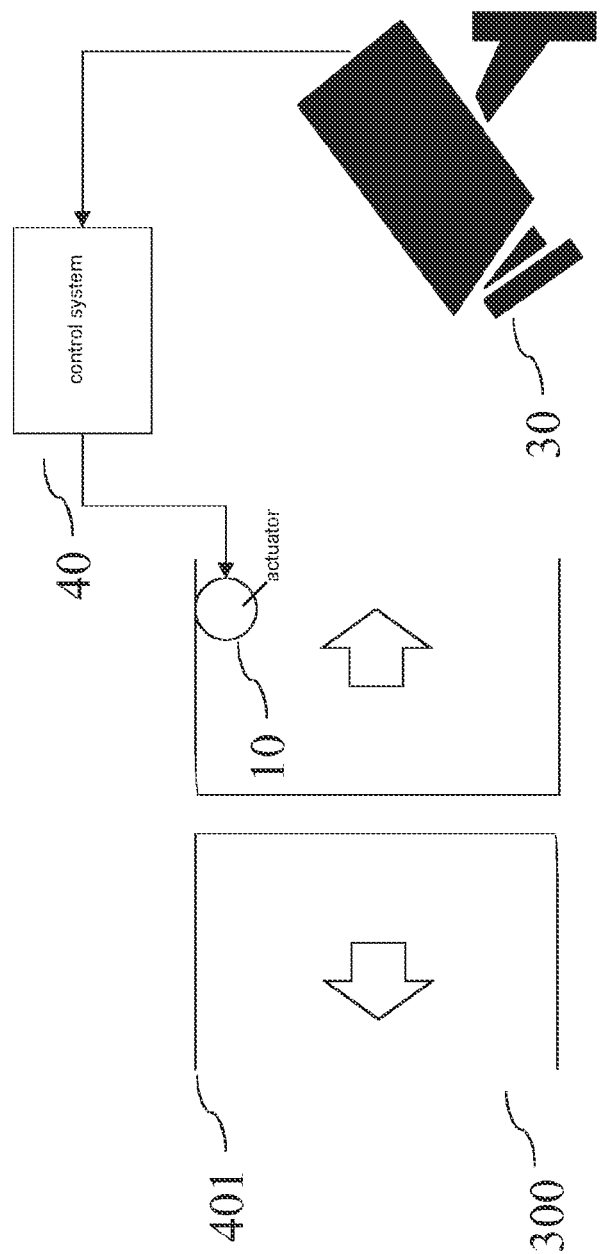
FIG. 6 schematically shows an exemplary embodiment of the present invention for controlling an access system.

FIG. 6 shows an exemplary embodiment in which control system 40 is used to control an access system 300. Access system 300 can include a physical access control, for example a door 401. Sensor 30 can be for example an optical sensor (for example for acquiring image or video data) that is set up to acquire a face. Using control system 40, this acquired image can be interpreted. For example, the identity of a person can be ascertained. Actuator 10 can be a lock for that, in the normal mode, releases or does not release the access control as a function of control signal A, for example opening or not opening door 401. For this purpose, control signal A can be selected as a function of the interpretation, for example as a function of the ascertained identity of the person. In the safety mode, it can be provided that actuator 10 is for example permanently controlled in such a way that the door is permanently open (or alternatively also is permanently closed). Instead of the physical access control, a logical access control can also be provided.

Figure 7:
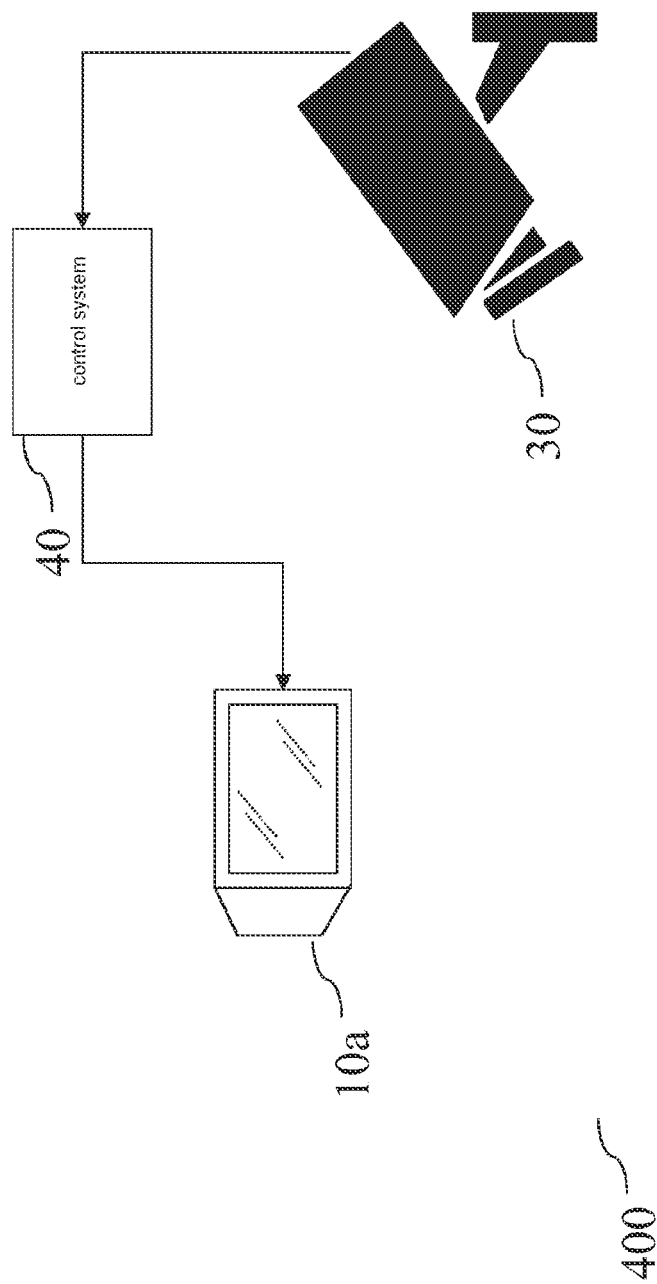
FIG. 7 schematically shows an exemplary embodiment of the present invention for controlling a monitoring system.

FIG. 7 shows an exemplary embodiment in which control system 40 is used to control a monitoring system 400. This exemplary embodiment differs from the exemplary embodiment shown in FIG. 6 in that, instead of actuator 10, display unit 10a is provided, which is controlled by control system 40. For example, anomaly detector 80 can ascertain whether an object recorded by the optical sensor is suspicious. If this is the case, the safety mode can be activated. In the normal mode, the object can then be normally reproduced by display unit 10a, whereas in the safety mode, the control signal A can then be selected such that this object is represented by display unit 10a with a color highlighting.

Figure 8:
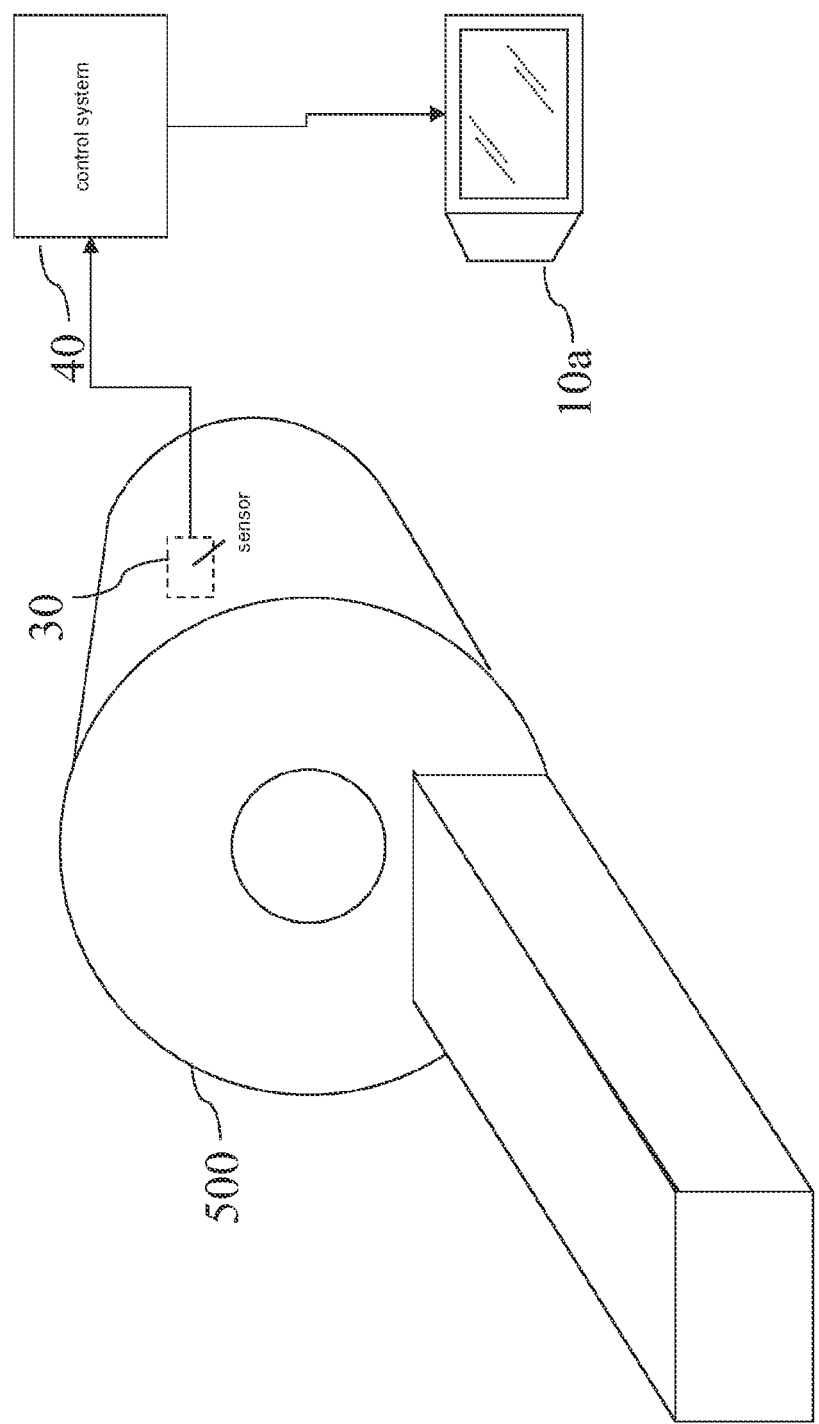
FIG. 8 schematically shows an exemplary embodiment of the present invention for controlling a medical imaging system.

FIG. 8 shows an exemplary embodiment in which control system 40 is used to control a medical imaging system 500, for example an MRT, x-ray, or ultrasound device. Sensor 30 can for example be an imaging sensor, and control system 40 can control display unit 10a. For example, anomaly detector 80 can ascertain whether a region recorded by the imaging sensor is conspicuous. If this is the case, the safety mode can be activated. In the normal mode, this region can then be displayed normally; in the safety mode, control signal A can be selected such that this region is shown by display unit 10a with color highlighting.

Figure 9:
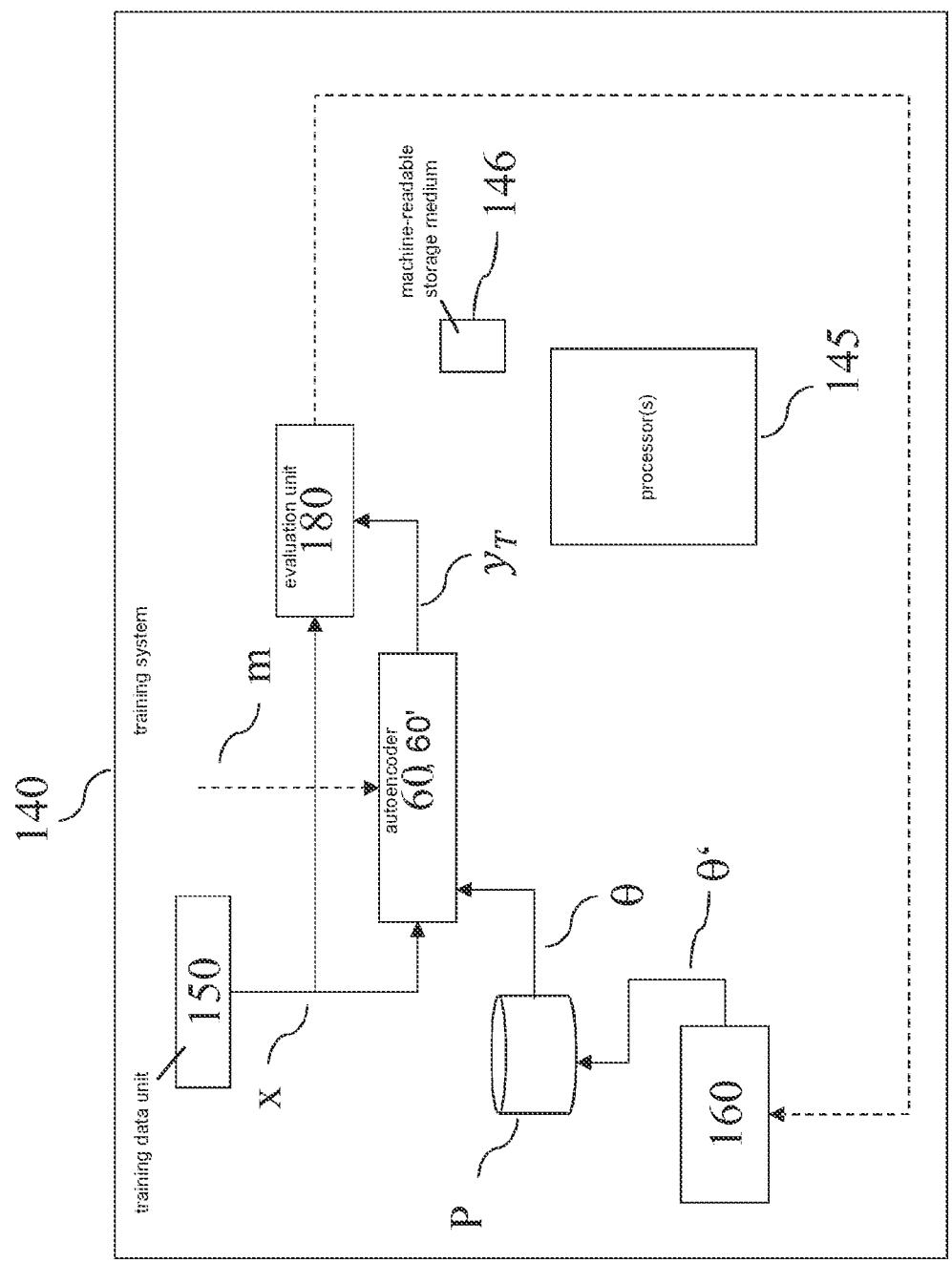
FIG. 9 schematically shows a training system for training the autoencoder, in accordance with an example embodiment of the present invention.
Figure 11:
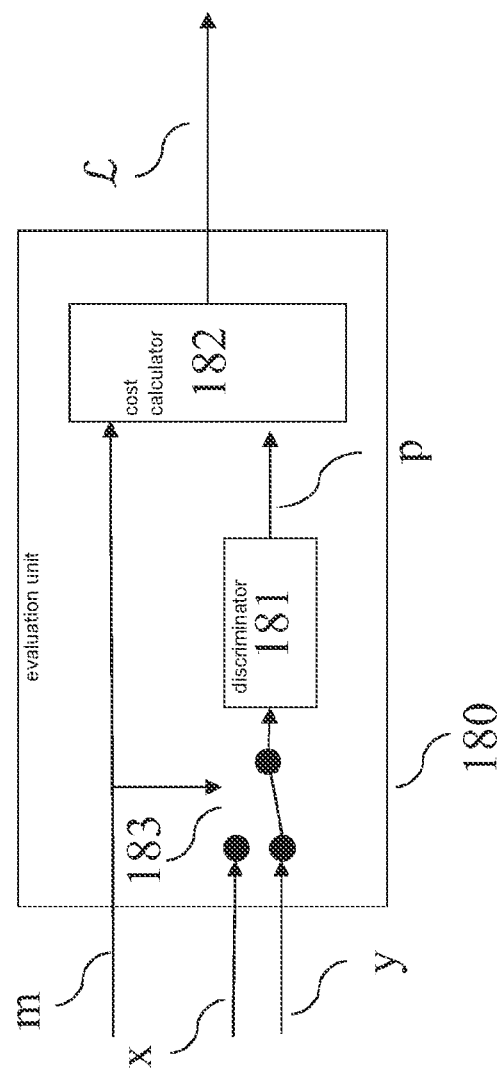
FIG. 11 schematically shows a design of a specific embodiment of an evaluation unit of the training system, in accordance with the present invention.

FIG. 9 schematically shows an exemplary embodiment of a training system 140 for training autoencoder 60. A training data unit 150 ascertains suitable input signals x that are supplied to a modified form of autoencoder 60, designated by reference character 60'. For example, training data unit 150 accesses a computer-implemented database in which a set of training data is stored, and e.g., selects input signals x randomly from the set of training data. These data are supplied to an evaluation unit 180, an example of whose design is illustrated in FIG. 11.

Modified autoencoder 60' is set up to ascertain, as a function of the input signals x supplied to it, associated training output signals $y_T$, each of which includes output signals y. A mode signal m is supplied to modified autoencoder 60', and modified autoencoder 60' ascertains training output signals $y_T$ as a function of this mode signal. These training output signals $y_T$ are supplied to evaluation unit 180.

For example using a cost function (loss function) that is a function of the input signals x and the training output signals $y_T$, evaluation unit 180 can ascertain the characteristic variable $\mathcal{L}$, which characterizes the performance of autoencoder 60. The parameters φ, θ can be optimized as a function of the characteristic variable $\mathcal{L}$. An example of a method for doing this is illustrated in FIGS. 12 through 16.

Figure 10:
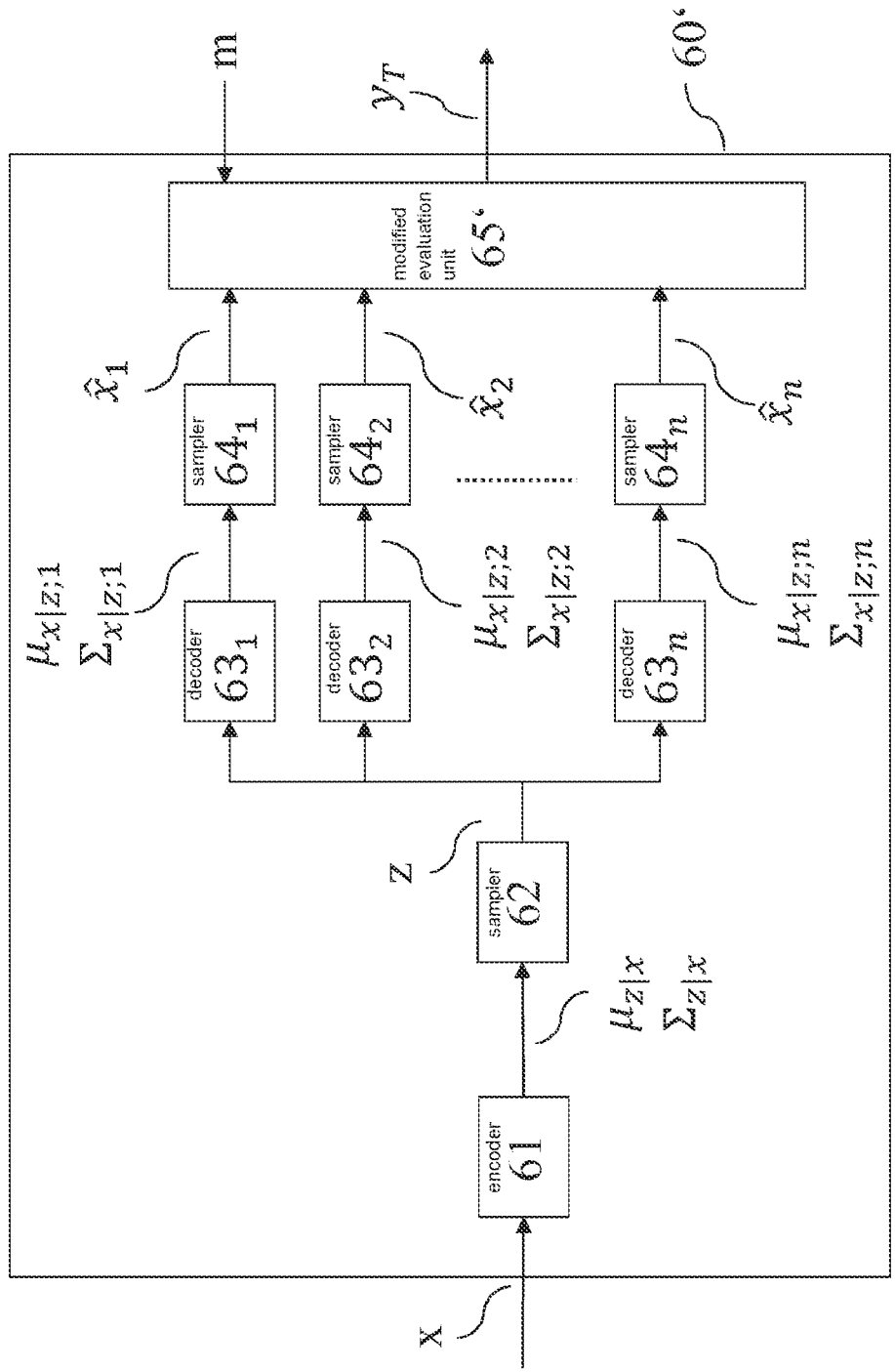
FIG. 10 schematically shows an autoencoder for use in the training system, in accordance with an example embodiment of the present invention.

FIG. 10 illustrates a specific embodiment of a modified autoencoder 60', which in large part is identical to autoencoder 60 shown in FIG. 2. In particular, the parameterization with parameters φ, θ is identical. In the following, only the differences are presented. Modified autoencoder 60' has, instead of evaluation unit 65, a modified evaluation unit 65', which, just as evaluation 65 does, ascertains output signal y. As a function of mode signal m, it is then decided which of the available variables are outputted as output signal $y_T$; i.e., the difference from autoencoder 60 lies in which variables are outputted.

FIG. 11 shows an example of a specific embodiment of evaluation unit 180. Evaluation unit 180 includes a discriminator 181, to which (for example selected via a switch 183) either input signal x or output signal y, extracted from training output signal $y_T$, is supplied. The discriminator includes a mathematical function, for example implemented by a neural network, with the aid of which a probability variable p is ascertained that characterizes a probability that the signal supplied to discriminator 181 is an output signal y generated by modified autoencoder 60', and not an input signal x. This probability variable p is supplied, together with mode signal m, to a cost calculator 182, which ascertains therefrom the characteristic variable $\mathcal{L}$, for example using the methods illustrated in FIGS. 13-16.

Figure 12:
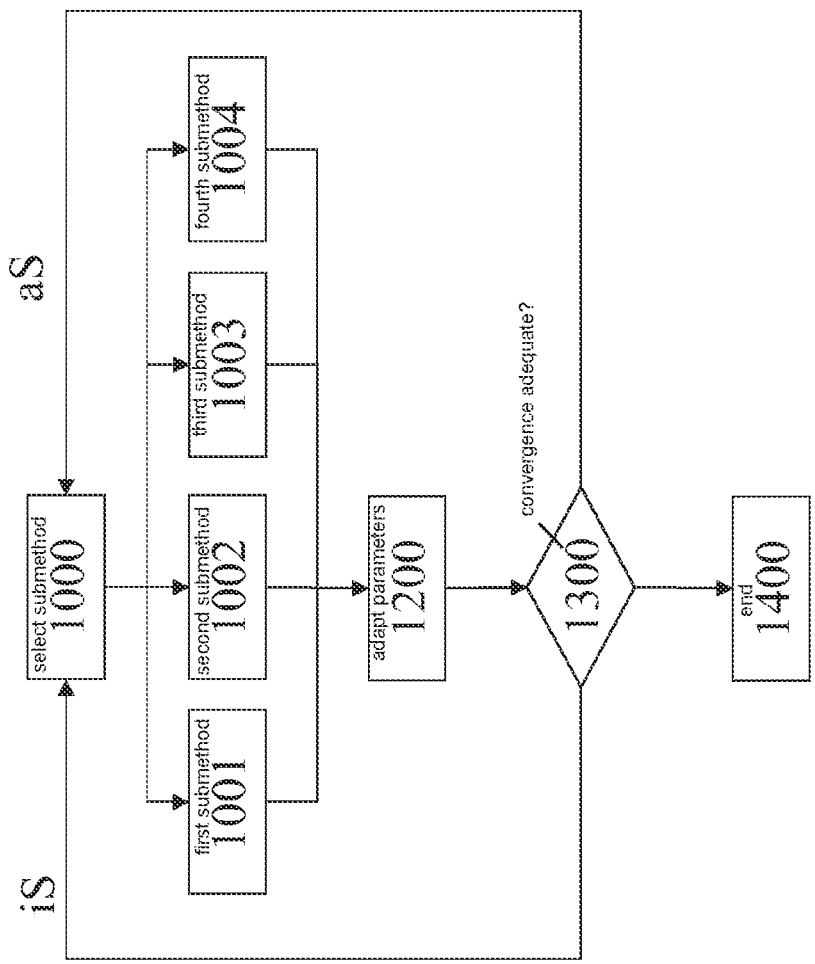
FIG. 12 shows, in a flow diagram, a specific embodiment of a method for training the autoencoder, in accordance with the present invention.

FIG. 12 shows a method for training autoencoder 60 (or modified autoencoder 60'). The method starts (1000) with a selection that is a function of mode signal m as to which of the following sub-methods (1001-1004) will be carried out. In steps, signals x, y are each supplied to discriminator 181, and as a function of these signals x, y discriminator 181 ascertains characteristic variables $\mathcal{L}_{VAE}, \mathcal{L}_G, \mathcal{L}_D$. Specific embodiments of the sub-methods (1001-1004) are illustrated in FIGS. 13-16.

Then (1200), e.g., using a gradient descent method, parameters φ, θ that parameterize autoencoder 60, or parameters that parameterize discriminator 181, are adapted. Here, parameters φ, θ of autoencoder 60 are adapted in such a way that characteristic variable $\mathcal{L}_{tot}=\mathcal{L}_{VAE}+\mathcal{L}_G$ is minimized, while the parameters of discriminator 181 are adapted in such a way that characteristic variable $\mathcal{L}_D=-\mathcal{L}_G$ is minimized. The convergence is checked in step (1300), and if the convergence is not adequate branching takes place back to the start (1000).

This adaptation can take place in cascaded fashion in the manner standard for GAN, i.e., it can be provided that, in an internal loop (is), first the autoencoder 60 is trained, and, if adequate convergence is present, discriminator 181 is trained in an external loop (as). The step of training autoencoder 60 can be skipped here.

If both the training of autoencoder 60 and also the training of discriminator 181 have terminated, the method (1400) ends.

Figure 13:
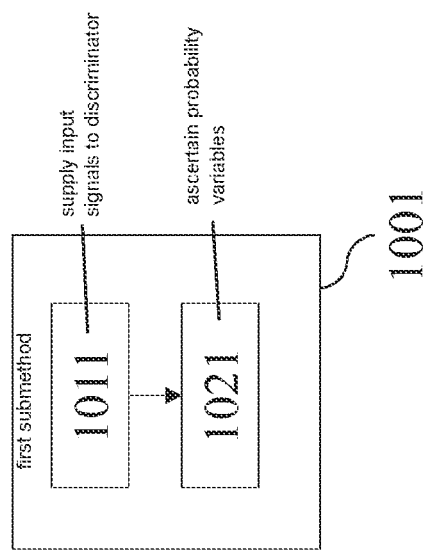
FIG. 13 shows, in a flow diagram, a specific embodiment of a part of the method for training the autoencoder, in accordance with the present invention.

FIG. 13 illustrates a specific embodiment of the first sub-method (1001). Here, input signals x, for example real images, are supplied (1011) to discriminator 181.

Discriminator 181 now ascertains (1021), for each of these input signals, the associated probability variable p, from which the associated characteristic variable is ascertained as $$\mathcal{L}_D = \Sigma_i \log(1-p_i) \tag{1}$$

The summation here takes place over all input signals x, and the respectively associated probability variable p is designated by a subscript. This sub-method ends therewith. The training of autoencoder 60 is omitted in the subsequent run-through of step (1200); i.e., only discriminator 181 is trained.

Figure 14:
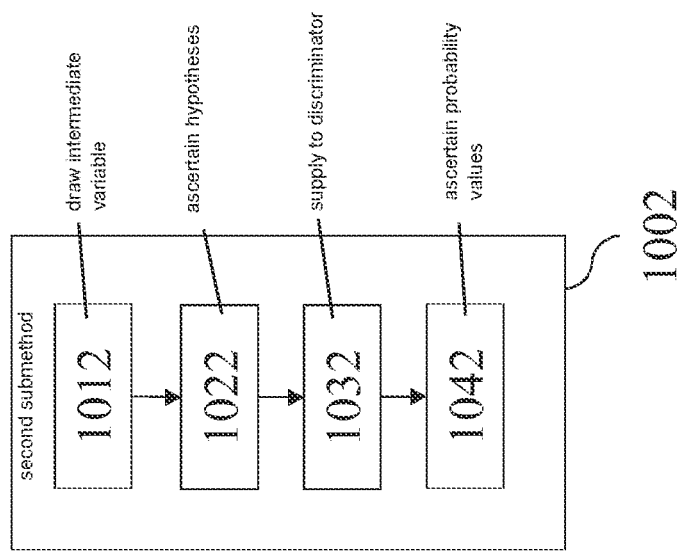
FIG. 14 shows, in a flow diagram, a second specific embodiment of a part of the method for training the autoencoder, in accordance with the present invention.

FIG. 14 illustrates a specific embodiment of the second sub-method (1002). Here, modified autoencoder 60' is controlled in such a way that sampler 62 draws an intermediate variable z from a normal distribution $\mathcal{N}$ (0,1) having mean value 0 and variance 1 (1012). Then (1022) hypotheses $\hat{x}_1, \hat{x}_2 \ldots$ are ascertained therefrom. These are transmitted together with training output signal $y_T$. Then (1032) these are supplied to discriminator 181, which ascertains the associated probability variables p. From these, the characteristic variable $$\mathcal{L}_D = \Sigma_i \log(p_i) \tag{2}$$

is ascertained (1042). Here the summation is done over all produced hypotheses, the respectively associated probability variable p being designated by a subscript. This sub-method ends therewith. The training of autoencoder 60 is omitted in the subsequent run-through of step (1200); i.e., only discriminator 181 is trained.

Figure 15:
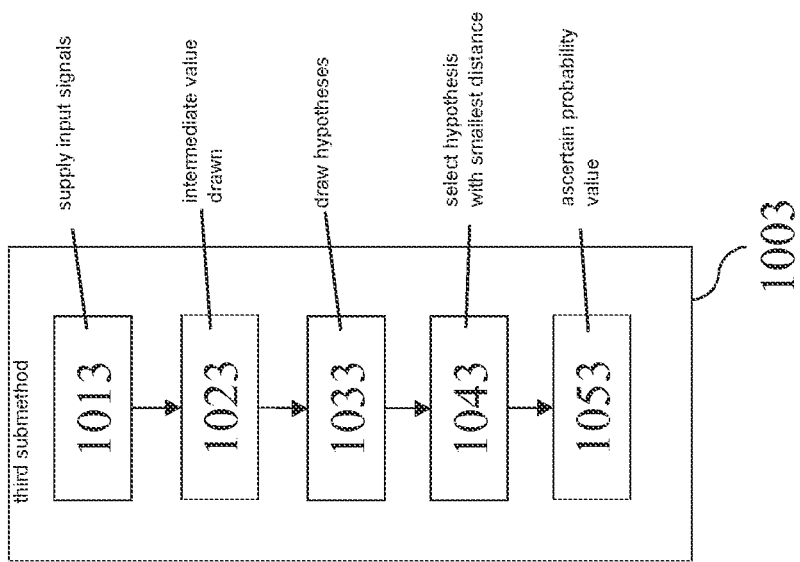
FIG. 15 shows, in a flow diagram, a third specific embodiment of a part of the method for training the autoencoder, in accordance with the present invention.

FIG. 15 illustrates a specific embodiment of the third sub-method (1003). Here, input signals x are supplied (1013) to modified autoencoder 60', and in each case an intermediate variable z is drawn (1023) from the corresponding probability distribution. Then (1033) from each of the samplers $64_1, 64_2, \ldots$ a specifiable number of hypotheses $\hat{x}_1, \hat{x}_2 \ldots$ is respectively drawn (if autoencoder 60 is a VAE, the specifiable number is preferably a plurality, and if it is a deterministic autoencoder, only one hypothesis is generated). Subsequently (1043), for each of the input signals, from the totality of the generated hypotheses that hypothesis $\hat{x}_k$ is selected that has the smallest distance from the input signal x. This selected hypothesis $\hat{x}_k$ and the associated index k are communicated with training output signal $y_T$. From this, the associated probability variable p is then ascertained (1053). From this, the characteristic variables $$\mathcal{L}_D = \Sigma_i \log(p_i) \tag{3}$$

$$L_{VAE} = E_z[\log(p_{\theta k}(x^{(i)}|z)] - D_{KL}(q\phi(z|x^{(i)}\|p_\theta(z)) \tag{4}$$

$$\mathcal{L}_G = -\mathcal{L}_D \tag{5}$$

are ascertained. Here the summation takes place over all input signals x, and the respectively associated probability variable p is designated by a subscript. This sub-method ends therewith.

Figure 16:
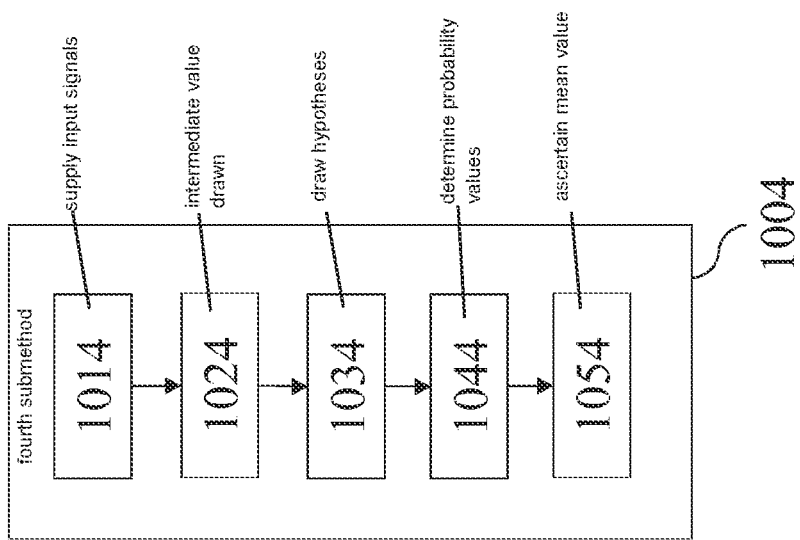
FIG. 16 shows, in a flow diagram, a fourth specific embodiment of a part of the method for training the autoencoder, in accordance with the present invention.

FIG. 16 illustrates a specific embodiment of the fourth sub-method (1004). It begins with the steps (1014) and (1024), which are identical to the steps (1013) and (1023) of the third sub-method (1003). Then (1034) a respective hypothesis $\hat{x}_1, \hat{x}_2 \ldots$ is drawn from each of the samplers $64_1, 64_2, \ldots$. From the generated hypotheses, that hypothesis $\hat{x}_k$ is selected that has the smallest distance from input signal x. This selected hypothesis $\hat{x}_k$ and the associated index k, as well as all further hypotheses $\hat{x}_1, \hat{x}_2 \ldots$, are communicated with training output signal $y_T$ and index k. Then (1044) the associated probability values p are ascertained. For each of the input signals x supplied in step (1014), a mean value $$\bar{p} = \frac{1}{n}\sum_j \log(p(\hat{x}_j))$$

is ascertained (1054), where n designates the number of hypotheses generated for input signal x and j indexes the hypotheses. From this, the characteristic variables are ascertained $$\mathcal{L}_D = \Sigma i \bar{p}_i \quad (3)$$

$$L_{VAE} = E_z[\log(p_{\theta k}(x^{(i)}|z))] - D_{KL}(q\phi(z|x^{(i)})\|p_\theta(z)) \quad (4)$$

$$\mathcal{L}_G = -\mathcal{L}_D \quad (5)$$

The summation here takes place over all input signals x, and the respectively associated mean value $\bar{p}$ is designated by a subscript. This sub-method ends therewith.

FIG. 17 illustrates a specific embodiment of the operation of control system 40. First (2000), input signal x is supplied to autoencoder 60. From this, autoencoder 60 then (2100) ascertains hypotheses $\hat{x}_1, \hat{x}_2 \ldots$. From this, (2200), that hypothesis $\hat{x}_k$ is selected that has the smallest distance from the input signal x. This selected hypothesis $\hat{x}_k$ is transmitted to anomaly detector 80 as output signal y. Anomaly detector 80 now (2300) provides the distance $a=|x-y|$ between output signal y and input signal x. This distance a is now (2300) compared with a specifiable threshold value $\alpha$. If distance a is smaller than specifiable threshold value $\alpha$, then (2400) it is decided that actuator 10 is to be operated in the normal mode, and control signal A is used to correspondingly control a selected actuator 10. If the distance a is not smaller than specifiable threshold value $\alpha$, then (2500) it is decided that actuator 10 is be operated in the safety mode, and control signal A is used to correspondingly control a selected actuator 10.

The method ends therewith.

In further preferred specific embodiments, training system 140 includes one or a plurality of processors 145 and at least one machine-readable storage medium 146 on which instructions are stored that, when they are executed on processors 145, cause control system 140 to carry out the method according to the present invention.

Of course, the method may be implemented not only entirely in software, as described. It may also be implemented in hardware, or in a mixed form of software and hardware.

What is claimed is:

1. A computer-implemented method for classifying an input signal that is ascertained as a function of an output signal of a sensor as to whether or not the input signal has an anomaly, the method comprising:
    deciding, as a function of an output signal of an autoencoder to which the input signal is supplied, whether or not the input signal has the anomaly;
    wherein:
        the autoencoder includes an encoder and a plurality of decoders;
        the encoder ascertains an intermediate variable as a function of the input signal;
        the plurality of decoders ascertain the output signal as a function of the intermediate variable;
        the autoencoder ascertains, for the input signal supplied to the autoencoder, a plurality of hypotheses for reconstruction of the input signal;
        each of the plurality of decoders provides a respective one of a plurality of output variables, with a respective one of the plurality of hypotheses being respectively provided to a respective one of the decoders as a function of the output variables; and
        the output signal is ascertained as a function of the plurality of hypotheses.

2. The method as recited in claim 1, wherein the output variables of the decoders each characterizes a probability distribution, and each of the hypotheses is drawn respectively from one of the probability distributions.

3. The method as recited in claim 1, wherein the output signal is selected as a function of whichever one of the hypotheses is, of the plurality of hypotheses, most similar to the input signal.

4. The method as recited in claim 1, wherein a control signal is selected as a function of whether or not the anomaly was recognized, the control signal being ascertained for controlling an actuator.

5. The method as recited in claim 4, wherein the control signal is for controlling an at least partly automated vehicle.

6. The method as recited in claim 4, wherein an at least partly autonomous robot and/or a production system and/or a personal assistant and/or an access system and/or a monitoring system and/or a medical imaging system, is controlled as a function of the ascertained control signal.

7. The method as recited in claim 1, wherein the autoencoder is trained using a discriminator, a first input signal or a first output signal generated by the autoencoder is supplied to the discriminator as a training signal, the discriminator is trained to distinguish whether the training signal supplied to the discriminator is the first input signal or the first output signal generated by the autoencoder, and the autoencoder is trained to generate the first output signal to minimize a distinguishability, by the discriminator, between the first input signal and the generated first output signal.

8. The method as recited in claim 7, wherein the intermediate variable is drawn from a fixedly specifiable probability distribution, only the discriminator being trained as a function of the output signal ascertained as a function the intermediate value drawn from the fixedly specifiable probability distribution.

9. The method as recited in claim 7, wherein;
    the encoder ascertains, as a function of the input signal, parameters that characterize a statistical distribution of the intermediate variable for the input signal, and the intermediate variable is drawn from the statistical distribution; and
    the discriminator attempts, for each of the hypotheses generated by the autoencoder as a function of the intermediate variable, to decide whether or not the respective hypothesis was generated by the autoencoder, and a variation of parameters that characterize the discriminator and/or the autoencoder is a function of results of all the attempted decisions.

10. The method as recited in claim 9, wherein whichever of the plurality of hypotheses generated by the autoencoder is most similar to the input signal is selected, the discriminator attempting to decide as a function of the selected most similar hypothesis whether or not the hypothesis was generated by the autoencoder, and an adaptation of parameters that characterize the discriminator and/or the autoencoder is a function of the result of the attempted decision.

11. The method as recited in claim 1, wherein the intermediate variable is generated randomly.

12. The method as recited in claim 1, wherein the ascertains, as a function of the input signal, parameters that characterize a statistical distribution of the intermediate variable for the input signal, and the intermediate variable is drawn from the statistical distribution.

13. The method as recited in claim 1, wherein each of the plurality of hypotheses is generated as a respective alternative potential reconstruction of an entirety of the input signal.

14. The method as recited in claim 1, wherein the ascertainment of the intermediate variable includes:
using the input signal to define a parameter space; and
performing a random selection from within the defined parameter space to randomly select the intermediate variable.

15. The method as recited in claim 1, wherein the ascertainment of the intermediate variable includes:
using the input signal to identify a statistical distribution that defines a set of possible values; and
sampling the set of possible values to select the intermediate variable from the set of possible values.

16. A non-transitory machine-readable storage medium on which is stored a computer program for classifying an input signal that is ascertained as a function of an output signal of a sensor as to whether or not the input signal has an anomaly, the computer program, when executed by a computer, causing the computer to perform:
deciding, as a function of an output signal of an autoencoder to which the input signal is supplied, whether or not the input signal has the anomaly;
wherein:
the autoencoder includes an encoder and a plurality of decoders;
the encoder ascertains an intermediate variable as a function of the input signal;
the plurality of decoders ascertain the output signal as a function of the intermediate variable;
the autoencoder ascertains, for the input signal supplied to the autoencoder, a plurality of hypotheses for reconstruction of the input signal;
each of the plurality of decoders provides a respective one of a plurality of output variables, with a respective one of the plurality of hypotheses being respectively provided to a respective one of the decoders as a function of the output variables; and
the output signal is ascertained as a function of the plurality of hypotheses.

17. A device configured to classify an input signal that is ascertained as a function of an output signal of a sensor as to whether or not the input signal has an anomaly, the device configured to:
decide, as a function of an output signal of an autoencoder to which the input signal is supplied, whether or not the input signal has the anomaly;
wherein:
the autoencoder includes an encoder and a plurality of decoders;
the encoder ascertains an intermediate variable as a function of the input signal;
the plurality of decoders ascertain the output signal as a function of the intermediate variable;
the autoencoder ascertains, for the input signal supplied to the autoencoder, a plurality of hypotheses for reconstruction of the input signal;
each of the plurality of decoders provides a respective one of a plurality of output variables, with a respective one of the plurality of hypotheses being respectively provided to a respective one of the decoders as a function of the output variables; and
the output signal is ascertained as a function of the plurality of hypotheses.

\* \* \* \* \*